Dec. 7, 1937.  G. F. KOTRBATY  2,101,073
STRUCTURAL BUILDING ELEMENT AND BUILDING MADE THEREFROM
Filed Dec. 20, 1934  6 Sheets-Sheet 1

INVENTOR
GUY F. KOTRBATY
BY
Frederick A. Norton
ATTORNEY

Dec. 7, 1937.  G. F. KOTRBATY  2,101,073
STRUCTURAL BUILDING ELEMENT AND BUILDING MADE THEREFROM
Filed Dec. 20, 1934   6 Sheets-Sheet 2

INVENTOR
GUY F. KOTRBATY
BY
Frederick A. Norton
ATTORNEY

Dec. 7, 1937.   G. F. KOTRBATY   2,101,073
STRUCTURAL BUILDING ELEMENT AND BUILDING MADE THEREFROM
Filed Dec. 20, 1934   6 Sheets-Sheet 4

INVENTOR
*Guy F. Kotrbaty*
BY
*Frederick A. Norton*
ATTORNEY

Dec. 7, 1937.  G. F. KOTRBATY  2,101,073
STRUCTURAL BUILDING ELEMENT AND BUILDING MADE THEREFROM
Filed Dec. 20, 1934  6 Sheets-Sheet 5

INVENTOR
Guy F. Kotrbaty
BY
Frederick A. Norton
ATTORNEY

Dec. 7, 1937. G. F. KOTRBATY 2,101,073
STRUCTURAL BUILDING ELEMENT AND BUILDING MADE THEREFROM
Filed Dec. 20, 1934 6 Sheets-Sheet 6

INVENTOR
Guy F. Kotrbaty
BY
Frederick A. Norton
ATTORNEY

Patented Dec. 7, 1937

2,101,073

UNITED STATES PATENT OFFICE 2,101,073

STRUCTURAL BUILDING ELEMENT AND BUILDING MADE THEREFROM

Guy F. Kotrbaty, New York, N. Y., assignor to Ferrocon Corporation, Bryn Mawr, Pa., a corporation of Delaware Application December 20, 1934, Serial No. 758,345

29 Claims. (Cl. 72—1)

This invention relates to improvements in building construction systems and elements therefor.

The improvements of the present invention relate more in detail to modified structural supporting and keying members and self-supporting structural wall members of the type generally described in my Patent No. 1,968,045 of July 31, 1934, and Patent No. 1,965,601 of July 10, 1934, and cognate applications and patents application Ser. No. 698,433; Patent No. 1,987,115 of January 8, 1935; Patent No. 1,995,477 of March 26, 1935; Patent No. 1,993,791 of March 12, 1935, and application Ser. No. 29,820.

The invention further includes improved floor and wall members and joint constructions including novel floor truss members and coacting parts therefor. In addition, the novel improvements of the present invention include provision for the utilization of preformed panelling of various types with or without the use of associated structural hardenable plastic materials bonded and applied to supporting panel members.

It is a feature of the present invention to provide a building construction system formed of self-supporting units mutually abutted and interlocked by novel structural key members.

It is another feature of this invention to provide improved structural elements, including stud members adapted to receive structural keying members and form composite supporting members therewith.

A further feature of novelty of the present invention is the provision of improved floor supporting means associated with structural wall supports.

Other features of novelty of the present invention include self-supporting building construction units adapted to be associated with other like units and separate members to form composite building supporting members provided with panel-receiving means for securing panelling or surfacings to the walls thereof.

These and other desirable features will be described in the accompanying specification and illustrated in the drawings, certain preferred forms being shown by way of illustration only, for, since the underlying features may be incorporated in other specific structural assemblies, it is not intended to be limited to the ones here shown except as such limitations are clearly imposed by the appended claims.

In the drawings like numerals refer to similar parts throughout the several views, of which

Figure 1:
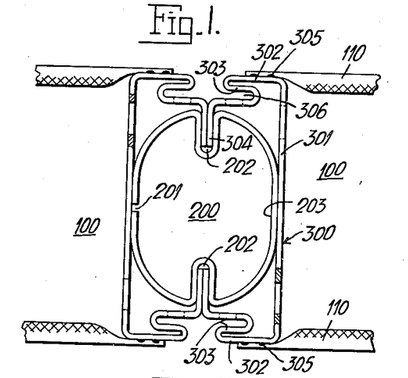
Fig. 1 is a horizontal section of a composite stud and support and associated building unit parts.
Figure 4:
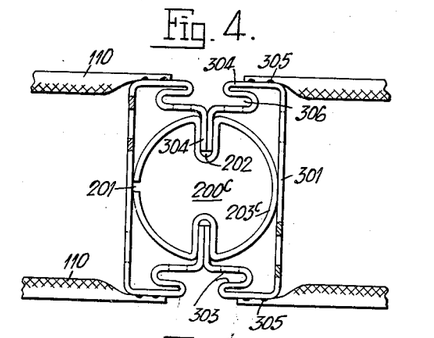
Figures 5, 6:
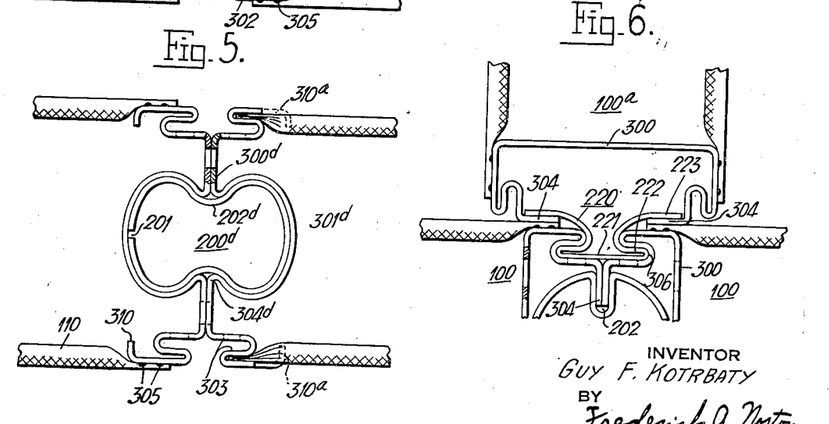
Fig. 6 is a vertical section of a continuous wall and intersecting or branch wall connection.

Referring now to Figs. 1, 2, 3, 4, and 5, the improvements of the present invention will be described as comprising a key member 200 of generally tubular shape having a continuous longitudinal slot 201 at one side thereof. The members 200 are provided with diametrically opposed intussuscepted channels 202 coextensive in length with the member 200. The side walls 203 of the keying member 200 may be flat, as shown in Fig. 1, or they may have a plurality of circular or partially circular shapes, a concave form being indicated at 203a of Fig. 2, a convex form being indicated at 203b of Fig. 3, while the member shown in Fig. 4 is substantially a true circle in cross-section. In Fig. 5, the keying member has a cross-section approximately a dumbell in outline and is provided with the usual continuous slot 201.

The keying members are adapted to lock end sections of self-supporting grids 100 forming space panel members 110 secured in any desired manner to end wall panels of sections, designated generally by the numeral 300. The improved end sections 300 comprise channel members having a body or base portion 301, side flanges 302 provided with a double bend forming parallel side walls 303 which terminate in an inturned edge member 304 substantially parallel to the base member 301. The members 304 are adapted to be fitted in and engaged by the channel portions 202 of the keying members. It will be seen that when a pair of abutted grids 100 have gripping flanges 304 abutted together, that a keying member 200 may be slid in place between the end sections 300 of the grids, the sections 304 of the end members being fitted in and locked by the channels 202 of the keys. Due to the accordion pleat formation of the folds or sections 303 of the inturned sides of members 300, a desired spring clip action is assured and the keys and abutted spring clip flanges usually coact to hold each other together in a positive locked relation.

The panel members 110 of the self-supporting grid members 100, may, as indicated above, be secured to or fastened onto the spacing end section or parallel keyways in any suitable manner, as by welding, brazing, soldering or riveting, clipped, bolted, screwed or wired all as indicated generally at 305. The panels 110 may comprise sheet members of a variety of materials such as structural plastic materials including phenolic condensation products of the type known commercially as bakelite, gypsum plastics, concrete sheet members, enameled metal plate members, composition wall board panels, expanded or pressed metal lath or paper backed wire lath, and sheet metal members of various gauges, depending upon the structural strength desired and the finish to be secured. These materials may also be used in combination with a backing or surfacing of aluminum foil or any other insulating materials such as celotex, mafia grass board, masonite, mineral or glass wool, bakelite impregnated paper or paper-base materials. In addition, where hardenable plastic materials such as lime plasters, gypsum plasters, and the like are to be applied as wall finishes, the penel members 110 may comprise, as noted above, ribbed, plain, expanded or pressed sheet metal.

The combination of the improved keys 200 with the novel spacing supports 300 permits the formation of improved structural members forming composite studs, stanchions, beams, joists, or rafters, the several parts of which coact to support each other and to form strong sustaining members. A desirable feature of this construction, and one of marked utility in building, resides in the fact that certain of the structural composite stud members may be incorporated as end sections of self-supporting grid units for building walls and the like, which units are adapted to be preformed and can readily be assembled in place in a building, being permanently secured by the key members 200, which in themselves form tubular or substantially tubular structural supporting members. Thus it will be seen that each of the members of the composite stud or joist structure exerts its own supporting function in the composite and that no part of the composite member can be considered or classed as non-supporting members.

In addition to the novel locking features permitted by the improved clip-flange members 304, the channels or spaces 306 formed between the folds or pleats 303 may serve as auxiliary keyways for other wall members normally intended to be positioned at right angles to a main wall section. Such a construction is shown more in detail in Fig. 6, where panel member 100a forming an abutting unit of an intersecting side wall, joining a continuous wall, formed of aligned abutted members 100, is held locked thereto by an auxiliary key 220. This key member has a flat body portion 221 terminating in folded sides 222 bent inwardly to permit engagement of the same with the channels 306 formed in the members 300 of abutted grid 100. The auxiliary keys 220 are further extended laterally with an outward bend 223 adapted to extend around and grip flanges 304 of the angularly positioned and abutted grid member 100a.

Thus it will be seen that the members 300 may be secured together by means of keys 200 and angular wall sections may be secured thereto by the use of special key members 220, or intersecting wall keys substantially coextensive in length with the grid members to form three-way connections wherever desired.

Referring now to Figs. 2, 3, 4 and 5, the modified forms of keyways will be specially designated as 200a, 200b, 200c and 200d for purposes of convenience. As previously noted, the member 200a has its sidewalls generally concave, while the member 200b is formed with convex sidewalls. The member 200c is, as shown, generally circular in cross-section, while the member 200d is generally of dumbell shaped cross-section. These several members permit a desired variation in the structural forms used without detracting from the strength necessary for carrying out of the load-supporting function of the several members alone and in the novel stud combination here shown. The members 300 will be conformed as indicated at 301a, 301b, and 301d to the various key members to provide a positive seating of the keys thereagainst.

Referring more specifically to the form shown at Fig. 5, it will be noted that the stud member 301d is formed as a deeply recessed keyway providing a positive seat for the key member 200d fitted therein. This latter is pinched inwardly as indicated at 202d so that the sections of the member 202d fit in the opposed members 301d with a bearing surface substantially coextensive with the entire peripheral surface of member 202d, acting as a locking surface in conjunction with the shouldered portions 304d formed therein.

While, as noted above, the panel members 110 of the grid units may be secured to the stud members 300 in any desired way, the members 300d shown in Fig. 5 may be provided with terminal edge flange portions 310, upon which the members 110 may be secured in the usual manner, where the lath or panel section is secured thereto on the outside thereof, or as indicated at 310a, the flange may serve to crimp the edges of the panel members between the accordion folds 303 and be pierced by the ends or edges of the members 301a, thus affording a positive mechanical interlock.

Figure 7:
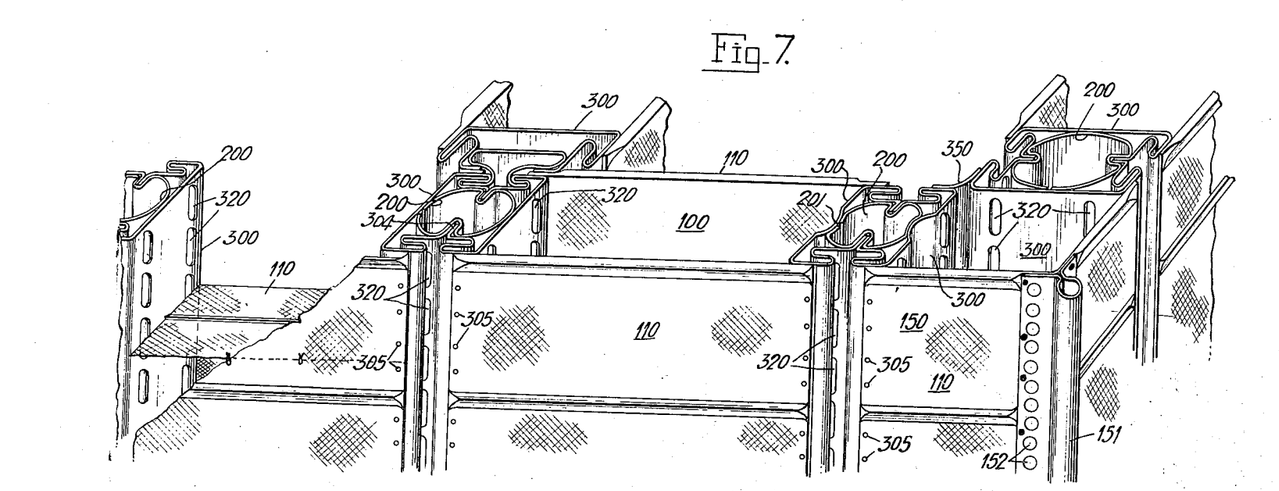
Fig. 7 is an elevation partly in broken section of a typical wall, intersection wall and corner construction.

Referring now to Fig. 7, there is shown in elevation a skeleton wall construction formed of self-supporting grids 100 with which are incorporated the novel structural composite stud members of the present invention. These members, as previously noted, comprise keying members 200 and opposed channel members 300 abutted and locked by the keying members. The members 300, as noted in Fig. 7, may be provided with apertures 320 to reduce conductivity and prevent rapid transfer or radiation of heat or cold from the inner surface to the outer surface of the panel without sacrificing any structural strength.

Figure 8:
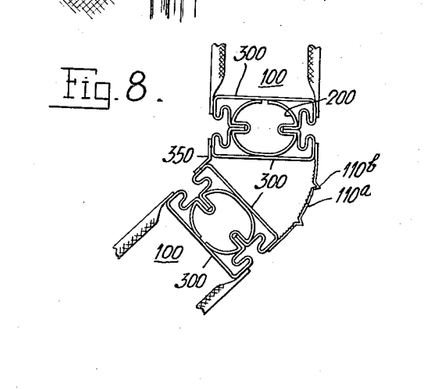
Fig. 8 is a horizontal section through a modified wall or adjustable corner angle unit.
Figure 9:
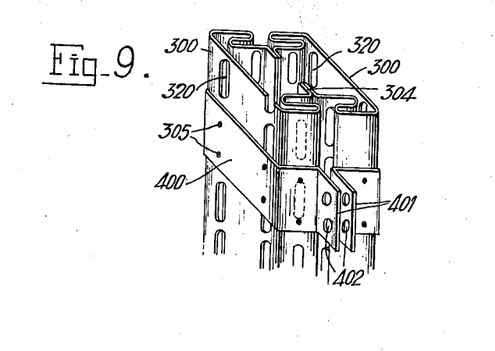
Fig. 9 is a projected elevation of a pair of abutted grid unit studs or stanchion members with associated floor supporting means.

To form a corner grid member 150 of any fixed angle a pair of keyway members 300 may be joined at any desired angle by a channel or spacer member 350 secured to the said members in any desired fashion. Panel sections 110 of ribbed lath may form the side members and a corner bead 151 may be secured to the members 110 in the usual manner. The members 151 may likewise be perforated, as indicated at 152, to form plastic bond receiving apertures.

Where a curved or angular corner of any sort is to be incorporated in a wall construction, the mode of operation shown in Fig. 8 is of distinct importance. Here the angular clip member 350 is secured to a pair of abutted channel keyway members 300 in the usual manner and a panel section 110a is applied to the other ends of the channel sections, the desired curvature being secured by bending the member 350 at a given angle along its central longitudinal axis. The panel members 110a, when made of ribbed lath, may have the ribs extending vertically, as indicated at 110b, to permit the facile bending and forming of the members.

Where floor sections are to be formed in conjunction with wall sections, strap, stirrup or connection members 400 may be formed around abutted channel members 300 and secured thereto by riveting, bolting, soldering, welding or the like, as indicated generally at 305. The stirrup or saddle members 400 are adapted to conform closely to the exterior of the abutted members 300 and are provided with flange plates 401 apertured, as indicated generally at 402, to receive bolts or rivets. These members are spaced apart a sufficient distance to receive a web 500 of a floor truss member.

Figure 10:
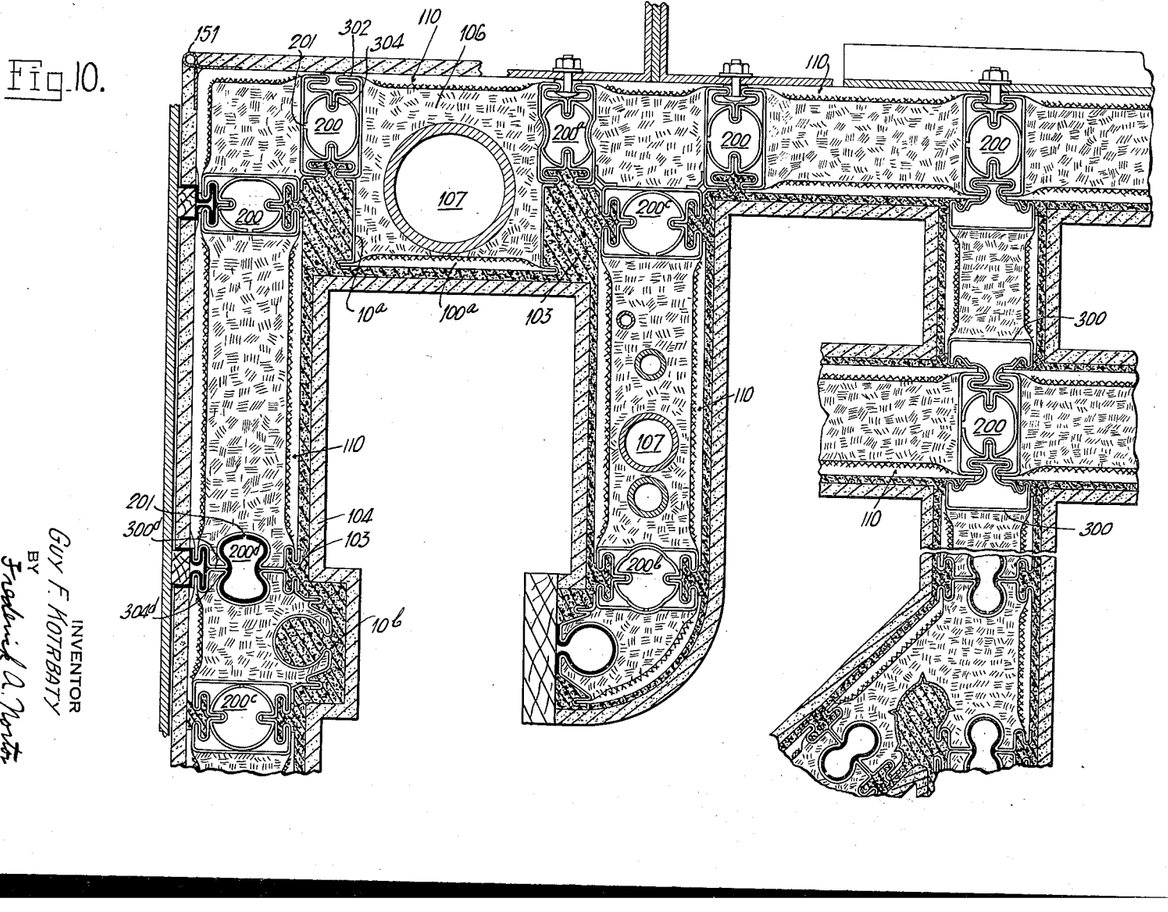
Fig. 10 is a schematic plan view of a portion of a building system showing method of assembly of the wall units and associated building services.

The various wall sections and modes of arranging the same are shown in plan view in Fig. 10, the several composite stud members herein disclosed being joined by the novel key members herein disclosed.

Referring now to Fig. 10, there is shown a partial plan view of a wall layout in which the method of forming interior partitions and pilasters, as well as interior members such as staircases and the like is shown. The walls generally are formed of the usual wall grid members 10 abutted together in the usual manner by the expansible keys 200 or 200a described more in detail hereinabove.

Where it is desired to form a cased opening or other decorative member of the pilaster type against a wall, as indicated generally at 100, it will be sufficient to use a three-way connecting grid 10b, the angularly disposed keyway and ties adjacent being filled with any suitable embedding plastic and configured as desired, as shown at 103. Over this plastic surface is applied the usual outer plastic coating 104.

The pilaster grids 10c are formed in substantially the same manner as the wall grids, the ends of the structure being provided with oversized lateral end channels 10a. The members 30 formed, it will be seen, provide an internal space 106 which is particularly adapted for the reception of pipe stacks, plumbing fixtures, electric wiring conduits and the like, indicated generally by the numeral 107. As will be referred to more in detail hereinafter, this flexibility of construction permits the introduction and manipulation of various services such as plumbing, wiring, etc., with a minimum of trouble, and without requiring added building features, which feature is characteristic of the grid members generally when it is desired to so use them, the various inserts being made to conform to the requisite dimensions.

Figure 2:
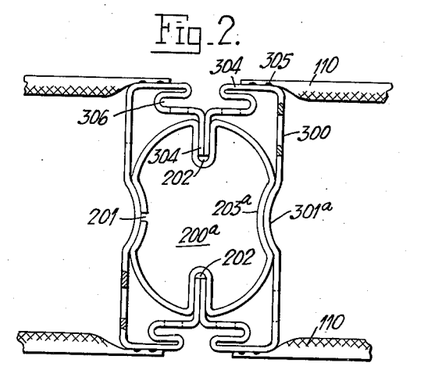
Figs. 2, 3, 4 and 5 are views similar to Fig. 1 showing modified forms of stud and key members.
Figure 3:
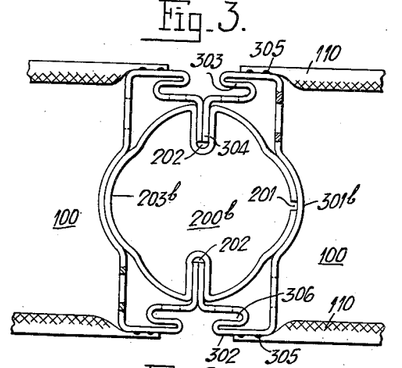
Figure 11:
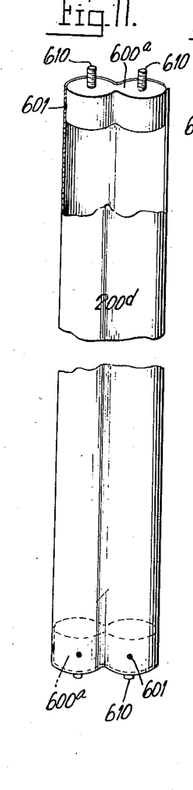
Figs. 11 to 16 are broken elevations, partly in section, of a variety of keying members fitted with means for mechanical anchorage.
Figure 12:
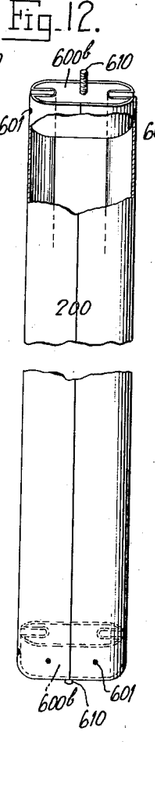
Figure 13:
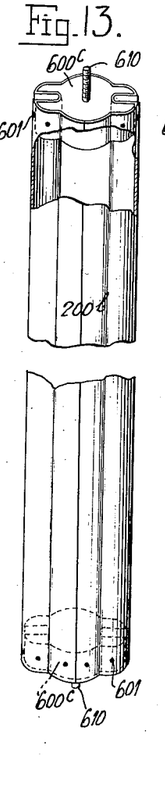
Figure 14:
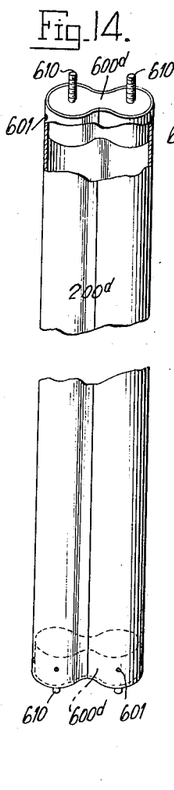
Figure 15:
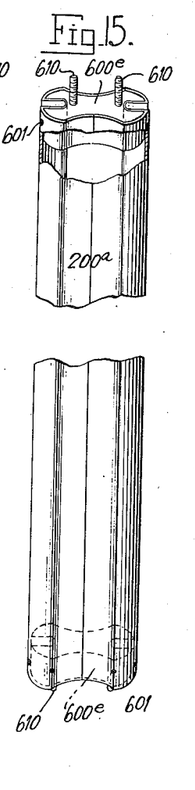
Figure 16:
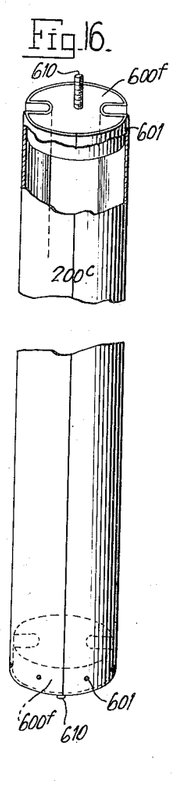

Referring now to Figs. 11 to 16, there is shown a plurality of keys having end plugs 600 fitted therein and secured thereto at the ends thereof. These members may be secured to the key members by welding, brazing, riveting and the like, all as indicated at 601. In Fig. 11 there is shown a key comprising generally two cylindrical sections having a pinched or inwardly grooved central portion. This type of key is provided with a double plug 600a, each portion of which is provided with outwardly extending stud bolts 610 secured therein. In Fig. 12 the member 600b is provided with a single stud bolt 610. The convex-sided member 600c of Fig. 13 is adapted for use in keys of the type shown in Fig. 3. Here also the usual stud 610 is provided. The construction of Fig. 14 is similar to the structure shown in Fig. 11 with the longitudinal slot of the key member disposed at one side between the cylindrical sections rather than at the edge of one of the cylindrical sections. In Fig. 14 a double plug 600d is provided. In Fig. 15 the key member 200a of Fig. 2 is shown with a plug 600e, having a pair of threaded studs 610. In Fig. 16 the cylindrical key 200c is provided with conformed plugs at either end thereof.

Figure 18:
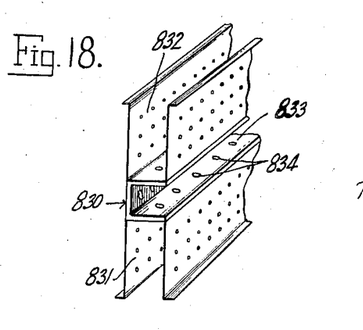
Fig. 18 is an end elevation of a novel floor and wall connecting member.
Figure 19:
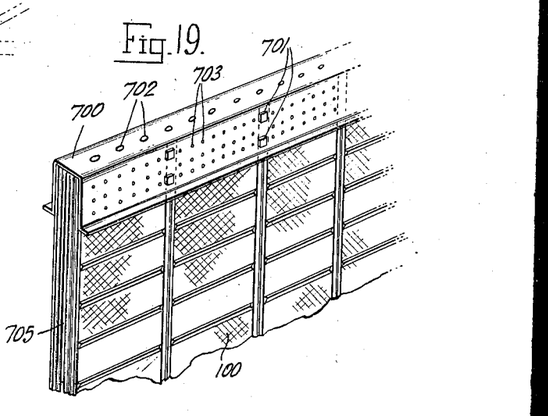
Fig. 19 is an elevation of a wall system with floor connecting cap member associated therewith.
Figure 20:
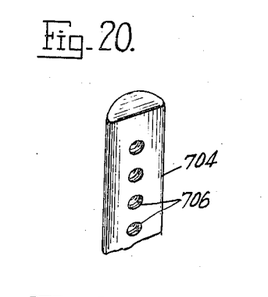
Fig. 20 is an elevation partly in detail, of a channel fastening member.
Figure 21:
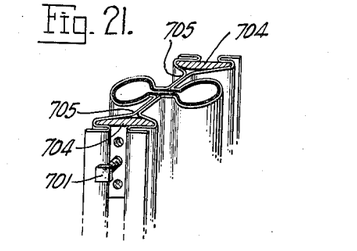
Fig. 21 is an elevation, partly in cross-section, of a wall connection showing the use of the members of Fig. 20.

Referring now to Figs. 21, 18 and 19, the method of forming floors, and of joining same to wall grids is shown. In this construction a wall grid cap or channel member 700 may be superposed over abutted grids 100 and locked thereto at desired intervals by means of bolts 701 passing therethrough. These channel members are perforated as indicated at 702 and 703. The perforations or apertures 702 are adapted to receive threaded studs 610 of the various types of key members, where used. The bolts 701 may be tapped into locking members 703 of any suitable metal and so conformed as to fit into the auxiliary keyways of the composite stud members of the type shown and described in my Patent No. 1,968,045 of July 31, 1934. These members are tapped, as indicated at 706, to receive the bolts 701. It will be appreciated that upon screwing up the bolts 701 in place the grids 100 will be securely locked to the grid cap channels 700, thus providing a positive mechanical bonding for the wall members in addition to the several keys in the composite stud members. In addition, the use of a grid cap construction of the type just described permits the positive alignment of wall members in a simple and efficient manner and with a minimum of parts required.

Figure 17:
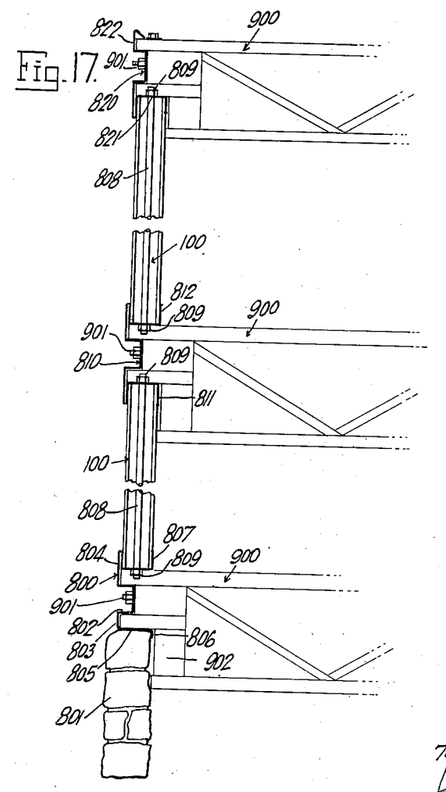
Fig. 17 is a vertical elevation in cross-section of a building wall construction with associated floor and roof assemblies.

Referring more specifically to Figs. 17 and 18, the method of forming an outside wall is shown. Here a base member 800 is supported on a basement foundation or wall section 801. A truss member 900 is fitted therein and wall grids 100 superposed on the member 800. An intermediate wall and floor supporting member 810 is superposed on the first course of wall grids, as indicated, to receive the wall grids of the next floor. In addition, the intermediate floor trusses are adapted to be secured thereto in a manner to be described more in detail hereinafter.

The member 800 comprises a channel section 802 with flanges 803, 804. The bottom flange 803 is continued to form a supporting member 805, having a lip or edge flange 806. The upper flange 804 is continued to form a grid-receiving channel designated generally by the numeral 807. In use the bottom 805 of the member is supported on the wall 801, the lip 806 serving as a guide for adjusting the same. The truss members 900 are supported on the section 805 and secured to the channel member 802 by bolt and nut constructions designated generally by the numeral 901. The wall channels 100 are fitted into the channel 807 and a combination wall-grid-cap member 810 is superposed thereon and secured thereto by means of a tiebolt 808 threaded at both ends to receive nuts 809. Floor truss members 900 are held in place in the channel members 810 by the usual stud and nut construction 901. The member 810 is provided with a pair of opposed channels designated by the numerals 811 and 812, respectively, adapted to fit over wall grids and to receive wall grids of a superposed floor. It will be appreciated that the wall and floors are simply and mechanically connected by means of a double channel member, which may be of rolled construction and is adapted to serve the triple function of a wall-grid-cap and a wall-grid-receiving channel, as well as an abutment and support for an improved floor truss member or any of my other patented floor system.

The several wall and floor grid members are held together in a simple manner by bolts and nuts to form an improved building joint for walls and floors. While continuous grid length bolts 808, threaded at both ends, have been disclosed as tying one floor to another, it will, of course, be appreciated that the key members may be provided with plugs 600 having threaded stud bolts 610 fitted therein, and that these will serve the same purpose. The members 800 and 810 or 820 may be rolled of sheet of any suitable gauge and are easily manufactured, yet provide great structural strength, forming a combination of building parts in which they are associated or incorporated. A roof connecting member 820 may have a wall grid cap channel 821 and be provided with a facia plate 822 adapted to receive a roof or truss member 900. A special combination wall grid-cap-channel member and grid-receiving-channel, as well as a floor connection member, is shown in Fig. 18, designated generally by the numeral 830. The wall grid-cap-channel 831 is separated from the grid-receiving-channel 832 by an intermediate horizontal channel 833. This latter channel is adapted to receive truss members 900. Apertures 834 are provided channel members to receive the several threaded stud members and permit them to be bolted in place.

Figures 22, 23, 24, 25:
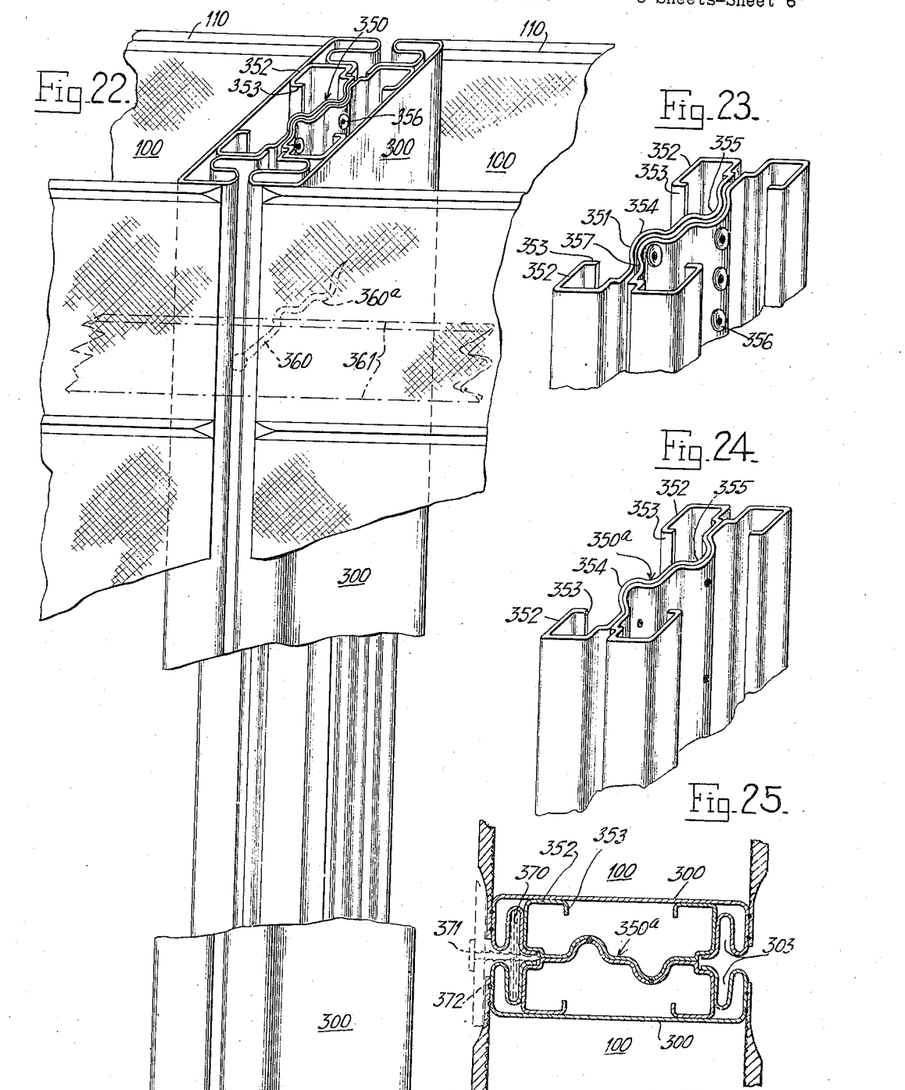
Fig. 22 is an elevation, partly in section, of a composite stud connection for wall grids, including nail-receiving and holding channels in the key members and showing fragmentary surfacings in phantom.
Fig. 23 is a fragmentary detail of the key member of the nail-receiving and locking key member of Fig. 22.
Fig. 24 is a view similar to Fig. 23 showing a modified key member.
Fig. 25 is a horizontal section of abutted wall members as keyed by keys of the type shown in Figs. 23 and 24 and including auxiliary nail-receiving means.

Referring now to Fig. 22, there is shown a novel form of structural composite stud members in which novel key members 350 are used. These members comprise opposed channel members 351 having lateral inturned flanges 352 with reinforcing lips 353. The central or body portion of the members 350 are fluted or convoluted as indicated at 354 and 355 and opposed sections are spaced apart as by means of domes 356 to form or provide a tortuous channel 357 between the parts of the member. The members may be secured together as by welding or riveting at the domes 356. When abutted grids are locked together by an improved key member of the type of member 350, nails 360 may be driven through boards 361 on the surface and are convoluted or twisted in the channel 357 as indicated at 360a, being thereby locked in position in the stud member. Thus it will be seen that by this method the stud key member while functioning as a locking member between two grid members also provides a means of nailing for any other material. Where desired the member 350 may be formed of closely abutted parts, as shown in Fig. 28, in which event the member 350a will be used purely as a keying member and not also as a nail locking member. The member 350a may be used as a nail locking member depending upon the elasticity and elongation limits of the thickness of steel used in its construction.

Referring now to Fig. 25, there is shown a second wall construction in which keying channels 303 of members 350a are provided with metal or wooden inserts 370 adapted to receive and hold nails 371, which may be driven through boards or plaster or lath 372 and hold the latter firmly in place. These constructions permit the applying of a variety of finishes of any desired type to walls, when made with the improved self-supporting construction units or open-ended grids of the present invention.

It will now be appreciated that there has been provided an improved building construction, including novel composite stud and support members, as well as novel floor truss members. In addition, there have been provided novel mechanical means for keying and joining wall and floor members together in a mechanically tight joint in a simple and efficient manner, and in which method various parts are adapted to be abutted and quickly and permanently secured by suitable bolt and nut members. In addition, there have been provided novel locking panel members, being adapted to be quickly secured in place in floors, ceilings and walls between studs and joints of improved type herein shown. The novel improvements of the present invention also include an improved method for assembling novel structural parts of the present invention, and further include novel means associated with the structural composite stud members for applying wood and other finishes to wall constructions.

The various features and combinations of structural parts have been shown herein by way of illustration only, and it is intended to claim all parts as broadly novel, particularly in their new combinations insofar as the state of the art will allow.

What is claimed is:

1. An improved wall and floor joint construction, including, in combination, vertical channel supporting members having locking flanges in mutually abutting engagement forming a composite structural member, and stirrup members around the composite structure of the channel members and provided with lateral flanges respectively spaced from each other, and adapted to receive floor supporting members.

2. An improved wall and floor joint construction, including, in combination, vertical channel supporting members having locking flanges in mutually abutting engagement forming a composite structural member, stirrup members around the composite structure of the channel members and provided with lateral flanges respectively spaced from each other, and floor truss members fitted in and between said lateral flange members and secured thereto.

3. An improved wall construction comprising abutted self-supporting grid units having spaced panel members secured together and spaced by channel end sections opening outwardly from the ends of the said units, said several channel end sections being provided with inturned flanges along the edges thereof and forming spring-gripping members, and locking means between abutted grid units and in direct engagement with abutted flanges of juxtaposed channel sections.

4. An improved wall construction comprising abutted self-supporting open-ended grid units having spaced panel members secured together and spaced by channel end sections opening outwardly from the ends of the said units, said several channel end sections being provided with inturned flanges along the edges thereof and forming spring-gripping members, and locking means between abutted grid units and in direct engagement with abutted flanges of juxtaposed channel sections.

5. An improved wall construction comprising abutted self-supporting grid units being closed top and bottom and having spaced panel members secured together and spaced by channel end sections, said several channel end sections opening outwardly from the units and being provided with inturned flanges along the edges thereof and forming spring-gripping members, and locking means between abutted grid units and in direct engagement with abutted flanges of juxtaposed channel sections.

6. An improved wall construction comprising abutted self-supporting grid units having spaced panel members secured together and spaced by channel end sections opening outwardly from the units, said several channel end sections being provided with inturned flanges along the edges thereof and forming spring-gripping members, and locking means coacting therewith and comprising generally tubular members having diametrical grooves formed in the interior thereof.

7. An improved wall construction comprising abutted self-supporting open-ended grid units having spaced panel members secured together and spaced by channel end sections, said several channel end sections opening outwardly from the units and being provided with inturned flanges along the edges thereof and forming spring-gripping members, and locking means coacting therewith and comprising generally tubular members having diametrical grooves formed in the interior thereof.

8. An improved wall construction comprising abutted self-supporting grid units being closed top and bottom and having spaced panel members secured together and spaced by channel end sections, said several channel end sections opening outwardly from the units and being provided with inturned flanges along the edges thereof and forming spring-gripping members, and locking means coacting therewith and comprising generally tubular members having diametrical grooves formed in the interior thereof.

9. An improved wall construction comprising abutted self-supporting grid units having spaced panel members secured together and spaced by channel end sections, said several channel end sections opening outwardly from the units and being provided with inturned flanges at the edges thereof and forming spring-gripping and locking members, and locking means coacting therewith and comprising generally tubular members having diametrical grooves formed in the interior thereof, the said flanges being fitted in and retained in locking relation by the said grooves.

10. An improved wall construction comprising abutted self-supporting open-ended grid units having spaced panel members secured together and spaced by channel end sections, said several channel end sections opening outwardly from the units and being provided with inturned flanges at the edges thereof and forming spring-gripping and locking members, and locking means coacting therewith and comprising generally tubular members having diametrical grooves formed in the interior thereof, the said flanges being fitted in and retained in locking relation by the said grooves.

11. An improved wall construction comprising abutted self-supporting grid units being closed top and bottom and having spaced panel members secured together and spaced by channel end sections, said several channel end sections opening outwardly of the units and being provided with inturned flanges at the edges thereof and forming spring-gripping and locking members, and locking means coacting therewith and comprising generally tubular members having diametrical grooves formed in the interior thereof, the said flanges being fitted in and retained in locking relation by the said grooves.

12. An improved key for locking structural building elements having end portions formed with spring-gripping and locking flanges adapted to abut against other like members of like building units, the said key members comprising elongated body portions of generally tubular construction and substantially coextensive in length with the building units with which they are associated, and being further provided with diametrical grooves adapted to receive abutted locking flanges of juxtaposed building members.

13. An improved key for locking structural building elements having end portions formed with spring-gripping and locking flanges adapted to abut against other like members of like building units, the said key members comprising elongated body portions of generally tubular construction and having a continuous longitudinal slot therein, and substantially coextensive in length with the building units with which they are associated, and being further provided with diametrical grooves adapted to receive abutted locking flanges of juxtaposed building members.

14. A composite building member comprising opposed structural members of generally channel shape and having inturned locking flanges formed at the edges thereof, and a key member engaging the said flanges in locking relation, the said key member comprising spaced plate members having abutted boss portions in locking engagement and the said plates having mutually conformed curvilinear longitudinal sections forming channels adapted to distort and grip nails driven thereinto in locking relation.

15. A composite building member comprising opposed structural members of generally channel shape and having inturned locking flanges formed at the edges thereof, and a key member engaging the said flanges in locking relation, forming locking means for the said opposed flanges comprising spaced plate members engaging and holding the flanges therebetween, the said plates having mutually conformed curvilinear longitudinal sections adapted to distort and grip nails driven thereinto in locking relation.

16. An improved wall and floor joint construction comprising in combination, vertical channel supporting members having locking flanges in mutually abutting engagement, stirrup members around each of the channel members and provided with lateral flanges respectively spaced from each other, and adapted to receive floor truss members fitted in and between said lateral flange members and secured thereto.

17. An improved self-supporting building construction unit comprising spaced panel members joined together and spaced by channel forms secured to the panel members at the ends thereof and opening outwardly of the unit, said channel forms being provided with edge gripping portions coextensive in length with the channels.

18. An improved self-supporting building construction unit comprising spaced panel members joined together and spaced by channel forms secured to the panel members at the ends thereof and opening outwardly of the unit, said channel forms being provided with inturned edge gripping portions coextensive in length with the channels.

19. An improved self-supporting building construction unit comprising spaced panel members joined together and spaced by channel forms secured to the panel members at the ends thereof and opening outwardly of the unit, said channel forms being provided with inturned edge gripping portions coextensive in length with the channels, and forming auxiliary keying members.

20. An improved key construction for building units formed of self-supporting grids having channeled end sections opening outwardly of the units and provided with inturned flanged edges, said key members comprising generally tubular structures having longitudinal grooves adapted to engage juxtaposed flanged edges of abutted building units and being further provided with securing members at the ends of the said key members and secured thereto, the said securing members being provided with integral anchoring pins.

21. An improved key construction for building units formed of self-supporting grids having channeled end sections opening outwardly of the units and provided with inturned flanged edges, said key members comprising generally tubular structures having longitudinal grooves adapted to engage juxtaposed flanged edges of abutted building units and being further provided with plug members at the ends of the said key members and secured thereto, the said plugs being provided with integral threaded anchoring pins.

22. An improved key construction for building units formed of self-supporting grids having channeled end sections opening outwardly of the units and provided with inturned flanged edges, said key members comprising generally tubular structures having longitudinal grooves adapted to engage juxtaposed flanged edges of abutted building units and being further provided with securing members at the ends of the said key members and secured thereto, the said securing members being provided with integral fastening means for abutted building members.

23. An improved key construction for building units formed of self-supporting grids having key engaging means formed in the ends thereof, said key members comprising generally tubular structures having diametrically opposed grooves, and being further provided with plug members at the ends of the said key members and secured thereto, the said plugs being provided with integral threaded studs.

24. An improved key construction for building units formed of self-supporting grids having key engaging means formed in the ends thereof, said key members comprising generally tubular structures having a plurality of diametrically opposed grooves, and being further provided with plug members at the ends of the said key members and secured thereto, the said plugs being provided with integral threaded studs.

25. In a building construction of the class described and including self-supporting wall grid units abutted together to form walls of a structure, the improvements comprising composite stud members formed by abutting end sections of adjacent grids and interposed and interlocking key members, the said grid end sections being provided with flange members adapted to fit into and be locked by said key members, and the said grid end sections further being so configured and arranged as to form auxiliary keyways, and auxiliary key members fitted in said auxiliary keyways, and securing angularly abutted grids to said wall sections.

26. In a building construction of the class described and including self-supporting wall grid units abutted together to form walls of a structure, the improvements comprising composite stud members formed by abutting end sections of adjacent grids and concealed interposed and interlocking key members, the said grid end sections being provided with flange members adapted to fit into and be locked by said key members, and the said grid end sections further being so configured and arranged as to form auxiliary keyways, and auxiliary key members fitted in said auxiliary keyways, and securing angularly abutted grids to said wall sections.

27. In a building construction of the class described and including self-supporting wall grid units abutted together to form walls of a structure, the improvements comprising composite stud members formed by abutting end sections of adjacent grids and internally disposed and interlocking key members, the said grid end sections being provided with flange members adapted to fit into and be locked by said key members, and the said grid end sections further being so configured and arranged as to form auxiliary keyways, for securing angularly abutted grids to said wall sections.

28. A structural stud and beam member comprising a channel section, the sides of the channel being bent inwardly at their edges to form angular key-retaining flanged sections, the said key-retaining flanges being formed with central longitudinal stiffening beads co-extensive with the channels and imparting spring tension thereto.

29. Structural members as claimed in claim 28 in which the key retaining flanges form gripping members of accordion pleat cross section.

GUY F. KOTRBATY.